United States Patent [19]

Fahey

[11] 3,940,357
[45] Feb. 24, 1976

[54] COATING AND COMBINED SIZING AND COATING COMPOSITION FOR GLASS FIBERS

[75] Inventor: Dennis M. Fahey, Aspinwall, Pa.

[73] Assignee: PPG Industries, Inc., Pittsburgh, Pa.

[22] Filed: May 6, 1974

[21] Appl. No.: 467,333

Related U.S. Application Data

[60] Division of Ser. No. 314,284, Dec. 12, 1972, which is a continuation-in-part of Ser. No. 93,937, Dec. 1, 1970, abandoned.

[52] U.S. Cl. ...... 260/29.3; 260/29.6 MM; 260/739; 260/824 EP; 260/845; 427/221
[51] Int. Cl.² .......................................... C08L 61/06
[58] Field of Search . 260/29.3, 845, 846, 29.6 MM, 260/739, 824 EP; 65/3; 117/126 GS, 126 GN; 427/221

[56] References Cited
UNITED STATES PATENTS

| | | | |
|---|---|---|---|
| 2,904,526 | 9/1959 | Uelzmann | 260/29.6 MM |
| 3,620,701 | 11/1971 | Janetos | 260/29.3 |
| 3,655,612 | 4/1972 | Stella | 260/42.18 |
| 3,743,612 | 7/1973 | Vial | 260/29.3 |

*Primary Examiner*—Lorenzo B. Hayes
*Attorney, Agent, or Firm*—John E. Curley; Robert DeMajistre

[57] ABSTRACT

Individual glass fibers are coated with a combined sizing and coating composition that includes a zinc salt having a solubility constant ($K_s$) of not less than $1 \times 10^{-3}$ complexed with ammonia as a substitute for all or part of the resorcinol-formaldehyde resin. The preferred combined sizing and coating composition includes as the latex constituent, a styrene-butadiene vinylpyridine terpolymer, as the resin constituent, resorcinol-formaldehyde and zinc sulphate complexed with ammonia and as the coupling agent, a silane selected from amino, amido, chloropropyl, epoxy, ureido-functional silanes. An aqueous solution of the combined sizing and coating composition is prepared and the individual glass fibers are coated shortly after attenuation with this combined sizing and coating composition. The coated individual glass fibers are thereafter gathered into strands and the strands are dried while spaced from each other. The dried strands are thereafter, collected on a forming tube. The coated strands are used as a glass fiber reinforcement for elastomeric products. The zinc salts complexed with ammonia, may also be used in a coating composition for use with glass fibers that have been previously coated with a separate sizing composition that includes a coupling agent.

12 Claims, 3 Drawing Figures

COATING AND COMBINED SIZING AND COATING COMPOSITION FOR GLASS FIBERS

CROSS-REFERENCE TO RELATED APPLICATIONS

This is a Division of application Ser. No. 314,284, filed Dec. 12, 1972, which is a continuation-in-part of application Ser. No. 93,937, filed Dec. 1, 1970, now abandoned.

BACKGROUND OF THE INVENTION

1. Field of the Invention

This invention relates to a coating composition and to a combined sizing and coating composition for glass fibers and more particularly to an aqueous coating and combined sizing and coating composition that includes a zinc salt complexed with ammonia for coating glass fibers for use in reinforcing elastomeric products.

2. Description of the Prior Art

It has long been recognized that glass fiber material should make an ideal reinforcement for automobile tires (U.S. Pat. No. 2,184,326), rubber timing belts (U.S. Pat. No. 2,135,057) and other elastomeric products. In preparing glass fiber materials for such application, individual glass fibers and groups of glass fibers in the form of strands, roving, fabric, and the like are coated with a rubber adhesive to aid in bonding of the glass to the elastomeric material to be reinforced. By far, the most widely used adhesive for preparing glass fibers for reinforcing rubber or rubber-like material is resorcinol-formaldehyde resin. The resorcinol-formaldehyde resin is generally applied to glass fiber material prior to molding of the reinforced elastomeric article by contacting a glass fabric or the like with an aqueous mixture having the resin dispersed therein. The aqueous mixture usually includes, in addition to resorcinol-formaldehyde resin, an elastomeric latex selected from natural and synthetic latices, since it is known that the incorporation of such latices into a rubber adhesive mixture aids in the bonding of the glass fiber material coated with such mixtures to the elastomeric material to be reinforced.

Largely because of its high cost, a satisfactory substitute for all or part of the resorcinol-formaldehyde resin has long been sought. Additionally, the resorcinol-formaldehyde resin is difficult to apply to the glass fiber material in a manner whereby the resin may thoroughly impregnate the fabric to coat the glass fibers forming the fabric. Therefore, often uncoated glass fibers remain in the fabric after being contacted with the resinous mixture. The strands, of course, are subject to glass-on-glass abrasion which can soon destroy the long strands of glass in a fabric and render its reinforcing properties unsatisfactory. In applying conventional resorcinol-formaldehyde containing aqueous coating compositions to glass fibers by conventional techniques such as a roller applicator described in U.S. Pat. No. 2,873,718, it has been found difficult to obtain in a single application, a coating of sufficient weight. That is, it is known that glass fiber material should realize a weight gain of at least about 15–20% and preferably about 25–30% by weight based upon dry glass for best results in reinforcing elastomeric compositions. Conventional resorcinol-formaldehyde mixtures, as applied to glass fiber materials, build to the desired coating weight only with difficulty, for example, as by increasing considerably contact time with the roller. Additionally, much of the coating may actually be squeezed off by the roller applicator, presumably due to the mixture's low viscosity and the tension exerted on the fibers.

U.S. Pat. No. 3,718,448 "Glass Fiber Forming and Coating Process" by Warren W. Drummond and Donald W. Denniston and assigned to the assignee of this invention, discloses apparatus for applying a combined sizing and coating composition to individual glass fibers and then drying the fibers in strands and collecting the dried strands on a forming tube. By this process the glass fibers are simultaneously coated with both the sizing and the coating in a single coating step that reduces substantially the time and equipment required to process the glass fibers for use as a reinforcement in elastomeric products. The combined sizing and coating compositions previously employed with this process included only resorcinol-formaldehyde as the resin constituent.

There is a need, therefore, for a combined sizing and coating composition that may be more economically prepared and applied to the glass fibers as a single coating.

SUMMARY OF THE INVENTION

Generally, the invention provides improved combined sizing and coating composition for glass fibers for use in reinforcing elastomeric materials wherein all or part of the conventional resorcinol-formaldehyde adhesive is replaced with zinc salt complexed with ammonia whereby the zinc salt is rendered soluble, or "solublized" in the aqueous media. A combined sizing and coating composition for treating glass fibers during their formation process may include zinc sulphate, ammonia, an elastomeric latex selected from natural and synthetic latices, and an amino, chloropropyl, epoxy, amido, or ureido-functional silane coupling agent. The composition may likewise include a portion of resorcinol-formaldehyde resin. Alternatively, a composition of the foregoing, without the coupling agent may be applied to a glass fiber strand or roving previously sized with an aqueous solution containing that coupling agent.

This invention provides novel combined sizing and coating compositions for preparing glass fibers for use in reinforcing rubber or rubber-like elastomers in a manner more economical than heretofore known. The invention provides novel combined sizing and coating compositions for glass fibers with improved impregnation of a glass fiber strand that is composed of a multiplicity of individual glass fibers or filaments with an aqueous rubber adhesive composition. There is provided combined sizing and coating compositions enabling the application or rubber adhesive to glass fiber material in a manner whereby high coating weights may be achieved. Moreover, there are provided combined sizing and coating compositions for glass fibers enabling the application of coupling agent and rubber adhesive chemicals to a glass fiber strand in a single step application. The buildup of adhesive on coating equipment such as guide eyes and bailer rolls is considerably reduced using the zinc salts of the instant invention and provides during coating, dips which have acceptable viscosities.

Other advantages and details of the invention will become apparent by reference to the following examples and more detailed description thereof.

DESCRIPTION OF THE PREFERRED EMBODIMENT

Figure 1:
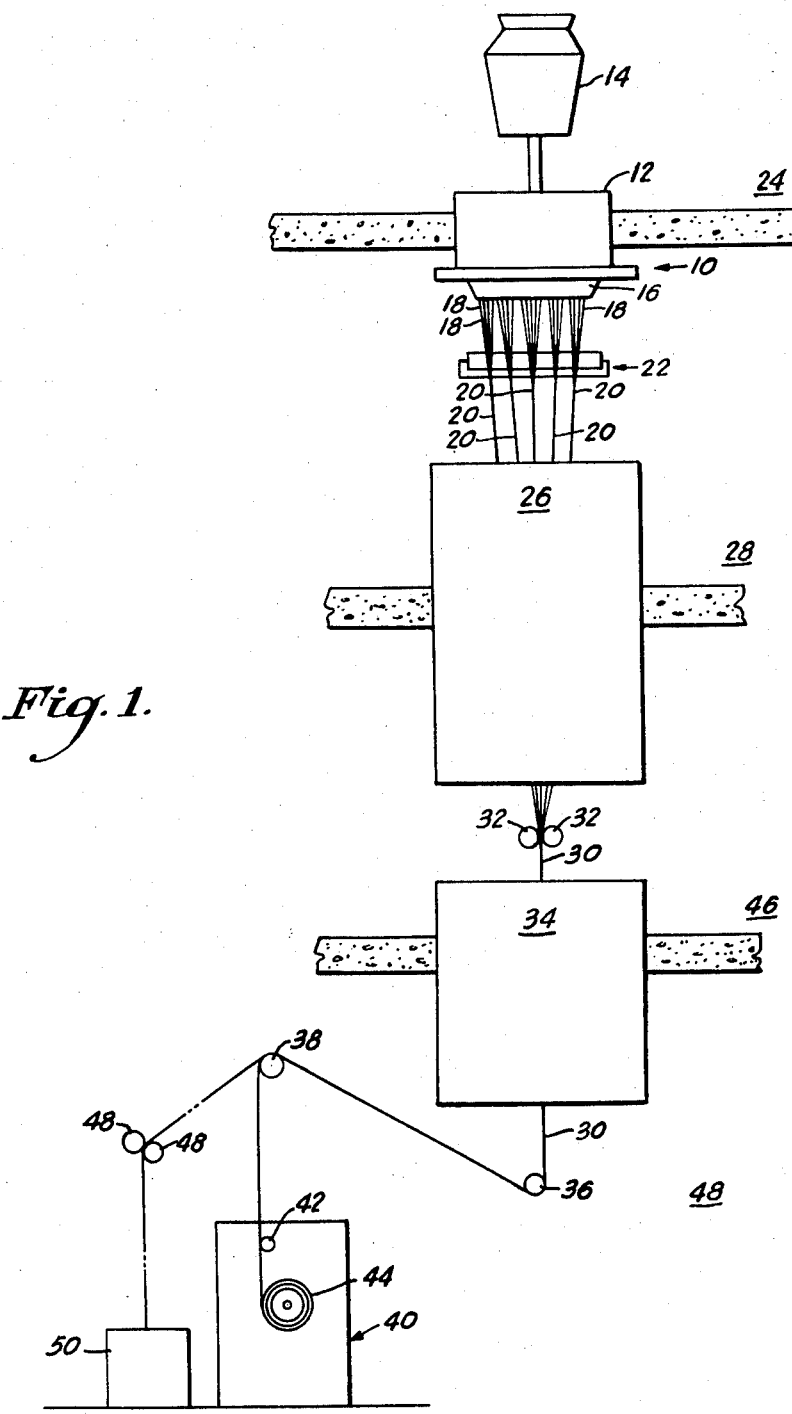
FIG. 1 is a diagrammatic view in elevation of a glass fiber strand forming, coating and drying operation.

Referring to the drawings and particularly to FIG. 1, there is illustrated diagrammatically fiber forming and coating apparatus with the fiber forming apparatus generally designated by the numeral 10. A premelter 12 in the fiber forming apparatus 10 is supplied with glass marbles from the supply hopper 14. Suitable controls are provided to automatically feed the glass marbles to the premelter 12 where they are melted and the molten glass flows through openings in a bushing 16 secured to the underside of the premelter 12. Glass fibers 18 are drawn or attenuated from cones of the molten glass suspended from tips in the openings in the bottom of the bushing 16. The bushing may, for example, have 40 pairs of rows with 25 tips in each pair of rows so that about 1,000 fibers can be simultaneously drawn from the tips in the bushing 16. From each of the pairs of rows about 25 fibers are gathered and form about 40 groups or strands of fibers designated by the numeral 20. The spaced strands or groups 20 pass through drying ovens as later described. Because the fibers 18 are drawn from the fiber forming apparatus, the hopper 14 and premelter are preferably located at the top level in the building designated in FIG. 1 by the numeral 24.

The separate fibers 18 pass over a conventional roller type coating applicator generally designated by numeral 22 that is positioned adjacent to the bushing 16 and is arranged to coat the individual fibers 18 with the later described combined sizing and coating composition. The individual fibers 18 after being coated with the combined sizing and coating composition are gathered into groups or strands 20 containing about 25 glass fibers 18. The strands 20 of the coated fibers are thereafter drawn downwardly through a first heating zone or oven 26 which may be a dielectric oven. The groups or strands 20, while separated from each other as illustrated in the drawings, are dried in the first heating zone 26 to remove the water and volatilize the ammonia in the combined sizing and coating composition on the fibers 18. The groups or strands 20 of fibers 18 are spaced from each other approximately one-half inch as they are drawn into the oven 26. The strands 20 remain spaced from each other in the oven 26 while the strands are being dried. The strands 20, while being drawn through the oven 26 located at a second level 28 immediately below the top level 24, converge toward each other and are joined into a single or composite strand 30 as they pass over a pair of graphite gathering shoes 32.

The single composite strand 30 is then drawn through a second heating zone or oven 34 where additional heat is applied to the coated fibers to further cure the coating so that the combined strand 30 forms a roving. The combined strand or roving 30 passes over suitable guides 36 and 38 to a glass fiber strand forming winder 40 such as that illustrated in U.S. Pat. Nos. 3,041,662; 3,151,963 and 3,256,079. The forming winder 40 has a traverse 42 that forms a generally cylindrical package 44 on the winder 40 with an open wind.

Alternately, the separate strands 20 of fibers 18 can be joined into a combined strand or roving 30 after passing through the oven 26 without further curing of the coating or the cured combined strand may be chopped into short discontinuous strands before the strand is wound on the forming winder 40.

As illustrated in FIG. 1, the lower portion of the oven 26, the graphite gathering shoes 32 and a portion of the second oven 34 are located at a still lower level 46. The demarcation between the various levels is indicated by the concrete floors. The lower portion of the oven 34 and the strand forming winder 40 are located at the lower level 48. The strand travel direction may be changed from the vertical direction illustrated to a horizontal direction prior to entry into the second heating zone 34 to again reduce the height of the building required to house the strand forming and coating apparatus.

It is preferred that the combined strand 30 be pulled continuously during changing of the packages 44 on the winder 40 in order to avoid rethreading the separate strands 20 and combined strand 30 through the oven 26. Thus, pulling wheels 48 are provided on one side of the winder 40 and are employed to direct the combined strand or roving 30 into a waste container 50.

Figure 2:
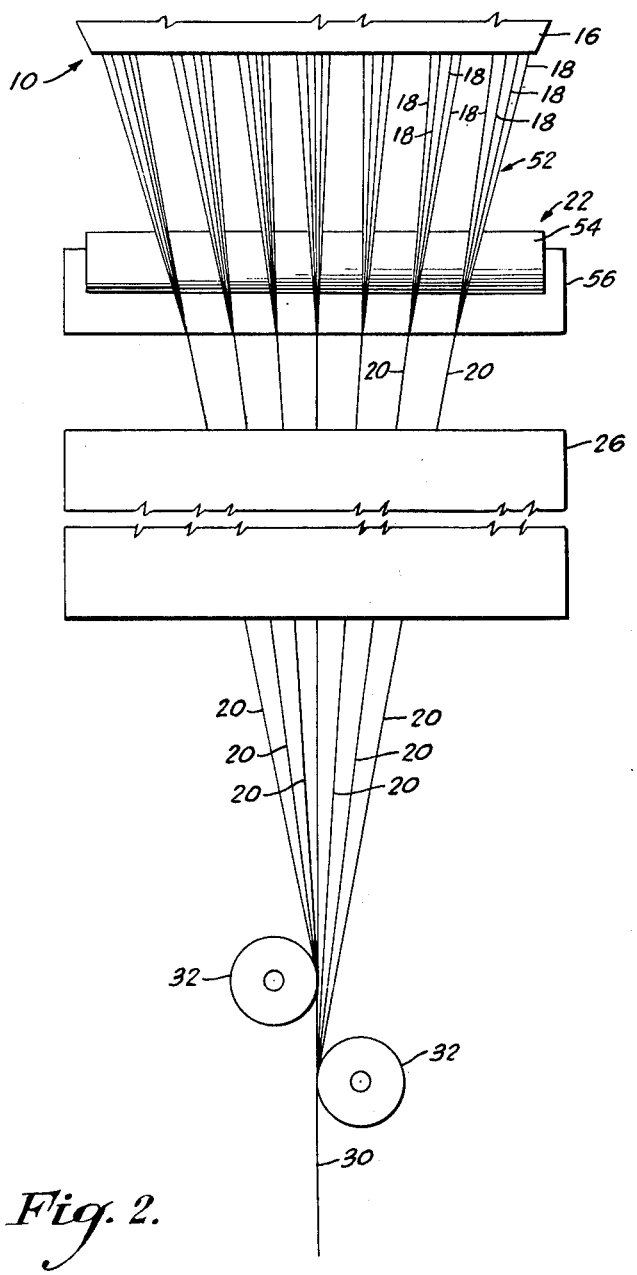
FIG. 2 is an enlarged view of the fiber forming and coating portion of the operation illustrated in FIG. 1.
Figure 3:
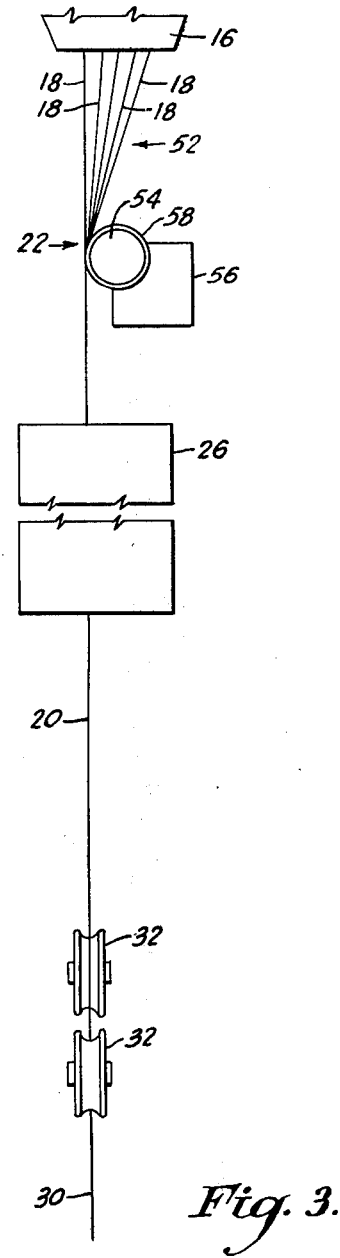
FIG. 3 is a side view of FIG. 2 illustrating the arrangement of the glass fibers as they pass through the forming and coating portion of the operation illustrated in FIG. 1.

Referring to FIGS. 2 and 3, the upper portion of the fiber forming and coating apparatus is illustrated in enlarged form. In FIGS. 2 and 3, the individual fibers 18 are formed into small inverted pyramide-shaped groups, generally designated by the numeral 52 that contain between 10 and 50 fibers. In the groups, the fibers 18 are arranged in spaced side-by-side relation. The individual fibers 18 pass over a roller 54 of the roller type applicator 22. The roller 54 is suitably supported on a support member 56 that has a reservoir containing a supply of the combined sizing and coating composition. As the individual fibers are drawn over the surface of the roller 54, the fibers 18 tend to first move together in a ribbon and then fold over each other as they separate from the surface of the coated roller 54. A layer of the combined sizing and coating composition designated by the numeral 58 is picked up by the individual fibers 18 from the roller 54 and the combined sizing and coating composition tends to adhere to the fibers and the fibers 18 tend to hold together into unitary group or strand 20 that has an oval shape in cross section. The groups or strands 20 present a much greater surface area for drying the coated glass fibers 18 within the strands 20 in oven 26 than if the fibers 18 and strands 20 were consolidated into the composite strand 30 before drying. With this arrangement, the drying rate for the separate strands 20 proceeds at a faster rate than the drying of a composite strand similar to the strand 30.

As stated hereinabove, the invention provides combined coating and sizing compositions for glass fibers for use in reinforcing rubber or rubber-like compositions. By "coating" composition, is intended a composition for coating glass fibers useful for reinforcing rubber and rubber-like materials which includes a rubber adhesive according to the invention, such as zinc sulphate or a combination of zinc sulphate and resorcinol-formaldehyde resin and an elastomeric latex, but which does not include a coupling agent. Such compositions are generally applied to glass fiber materials which have previously been "sized" by contact with an aqueous composition containing the coupling agent. By combined sizing and coating composition is intended a composition for coating glass fibers useful for reinforcing rubber and rubber-like compositions which includes, in addition to the rubber adhesive and elastomeric latex, a coupling agent according to the invention. The "coating" composition may be applied by a conventional roller applicator after a sizing composition has been applied to the glass fibers by a separate applicator. The combined sizing and coating composition may be applied in accordance with the previously described process.

Coupling agents are generally chemicals which render the surface of glass fiber materials substantive and compatible with the resin with which they are to be employed in preparing a glass fiber-reinforced rubber or rubber-like product, and which aid in bonding the fibers thereto. Coupling agents useful in the invention comprise generally amino, chloropropyl, epoxy, amido and ureido-functional silane coupling agents which contain in addition to the aforementioned functional groups, one or more hydrolizable moieties connected to the silicon atom. Illustrative of such coupling agents are aminosilane coupling agents of the general formula

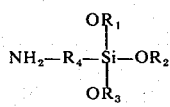

wherein $R_1$, $R_2$ and $R_3$ are the same or different and are selected from lower alkyl or aliphatic hydrocarbons having less than eight and preferably less than five carbon atoms. $R_4$ is a biradical also selected from lower alkyl or aliphatic hydrocarbons having less than eight and preferably less than five carbon atoms. Illustrative of the amidosilane coupling agents is gamma-acetamidopropyltriethoxysilane. Illustrative of the ureido-functional coupling agents is gamma-uriedopropyltriethoxysilane.

Suitable elastomeric latices useful in the invention may be selected from natural and synthetic rubber latices such as neoprene, isoprene, butylrubber, butadiene-styrene copolymers, acrylonitrilebutadiene-styrene terpolymers, styrene-butadiene-vinylpyridine terpolymers, and the like. Preferably a styrene-butadiene-vinylpyridine terpolymer latex is employed such as that sold or marketed by General Tire and Rubber Company under the trade name "GenTac" latex.

Compositions according to the invention may generally be prepared by incorporating a zinc salt into a more or less conventional aqueous adhesive coating composition for preparing glass fibers for reinforcing elastomeric products. Representative of the zinc salts useful according to the invention are zinc sulphate, zinc phosphate, zinc nitrate, zinc chloride, zinc acetate and other zinc salts having a solubility constant of not less than $1 \times 10^{-3}$. It has been found, however, that these salts may not be added directly to a conventional aqueous coating composition but, rather, each must be completed with ammonia whereby the salts are rendered soluble and stable in the aqueous medium comprising the coating composition. Direct addition of the zinc salts to an ordinary coating composition without first complexing the zinc salts with ammonia or without having sufficient ammonia present in the coating composition to complex the zinc salt upon addition thereto, results in an immediate reaction of the zinc salt which can destroy the dispersion, or emulsion, or resinous and elastomeric materials in the combined sizing and coating or the coating composition.

Zinc oxide or zinc hydroxide is not useful in preparing the combined coating and sizing compositions of the instant invention because they cause, due to their low solubilities, undesirable thickening of the coatings which results in coatings having unacceptably high viscosities. Coatings utilized in accordance with this invention have viscosities of less than 15 centipoises. It has been found that zinc oxide for example at very low concentration in the coating formulations contemplated herein causes undesirable thickening of the coating composition and "runnability" of coated strand which is not acceptable. By "runnability" is meant the lack of irregularity in running strand through the coaters, dryers and auxiliary equipment and the minimized buildup of dip on surfaces contacting the coated strand during processing. On the other hand addition of the zinc salts complexed, or "solubilized" according to the invention, does not destroy or adversely affect the coating bath or the runnability of the coated cord. Rather, it is believed, though the invention is not to be limited expressly thereto, that the complexed zinc salts, when present in a coating composition, have the ability to undergo rapid, in-situ disproportionation on drying to provide zinc hydroxide and a mineral acid, such as sulphuric acid. The zinc hydroxide may then act as a mild coagulating or thixotropic agent aiding thereby in the application of a uniform and high weight coating to a glass fiber in contact with the composition. The mineral acid formed may perform as an acid curing agent for the resinous materials present. Thus, it has been found to be critical that the acid zinc salts either be complexed with ammonia prior to admixture with a coating composition or that there be sufficient ammonia (ammonium hydroxide) present in a coating composition to complex the amount of zinc sulphate added thereto.

Where it is desired to prepare a combined sizing and coating composition having a high solids content especially in large commercial batches, or a combined sizing and coating composition containing excess formaldehyde, a stabilizer should preferably be added to the coupling agent as described in my copending application entitled "Coating Composition and Process for Preparing and Applying the Coating Composition to Glass Fibers", Ser. No. 93,939, filed Dec. 1, 1970, now abandoned, and assigned to the assignee of the instant invention. The stabilizer will prevent precipitation of the latex in the composition.

A suitable formulation for practice of the invention has the following ranges of constituents:

| Constituent | % By Weight |
|---|---|
| Butadiene-styrene-vinylpyridine latex 15:70:15 ratio | 20 –70 |

| Constituent | % By Weight | |
|---|---|---|
| (41% wt. solids, aqueous dispersion) Resorcinol-formaldehyde | 0 –10 | |
| Coupling Agent | 0 –3 | (for coating solution) |
| | 0.01 –3 | (for combined sizing and coating) |
| Zinc Salt | 0.01 –5 | |
| Ammonia (28% by weight solution) | 0 –10 | |
| Water | 60 –85 | |
| Other materials (lubricants, surfactants, stabilizers, etc.) | 0 –5 | |

The following examples are illustrative of compositions according to the invention which are useful in small laboratory size batches (2 gallons) not requiring stabilization as discussed above. All parts given are parts by weight unless indicated otherwise.

EXAMPLE I

Combined Sizing and Coating Composition

This example is illustrative of a combined sizing and coating composition for glass fibers useful for preparing reinforced elastomeric products wherein no resorcinol-formaldehyde resin is employed. To a vessel under mild agitation was charged 250 parts of GenTac elastomeric latex (a styrene-butadiene-vinylpyridine terpolymer in the approximate ratio of 15:70:15 comprising 41% by weight solids, marketed by General Tire and Rubber Company), 230 parts water, 20 parts ammonia, 0.5 parts zinc sulphate ($ZnSO_4$), and 1 part coupling agent, gamma-aminopropyltriethoxysilane.

It is noted that glass fiber material contacted with the foregoing composition by a conventional applicator, such as the roller applicator illustrated in the drawings, and previously described, realized a weight gain of between 15 – 20% by weight based on dry glass, exhibited excellent adhesion to rubber stock and in addition, yielded reinforced rubber stock having excellent tensile strengths. It was also noted that the combined sizing and coating composition prepared in the example showed good compatibility with little or not settling out of chemicals from the aqueous mixture.

EXAMPLE II

Combined Sizing and Coating Composition

This example illustrates a combined sizing and coating composition according to the invention wherein there is included a portion of furfuryl alcohol, the use of which in combined sizing and coating compositions is more fully disclosed and claimed in U.S. Pat. No. 3,718,449, entitled "Sizing, Coating and Combined Sizing and Coating Composition for Glass Fibers."

A combined sizing and coating composition having the following formulation was prepared:

| | |
|---|---|
| GenTac synthetic rubber latex (15:70:15) Styrene-butadiene-vinyl-pyridine | 185 parts |
| Furfuryl alcohol | 25 parts |
| Polyvinyl alcohol | 2.5 parts |
| Polyethoxyalkylphenol (Surfactant) | 1 part |
| Zinc sulphate ($ZnSO_4$) | 0.5 part |
| Ammonia | 10 parts |
| Gamma-aminopropyltriethoxysilane | 1 part |
| Water | 280 parts |

In the above formulation, zinc sulphate may be added directly to the remaining constituents comprising the composition, or may be complexed prior to addition thereto by mixing with the ammonia and a portion of the water in the formulation. Glass fiber material coated with the foregoing combined sizing and coating composition exhibited excellent adhesion to elastomeric material and in addition, the elastomeric material reinforced with such coated glass fiber materials exhibited excellent tensile strengths.

EXAMPLE III

The method of Example II was repeated with the exception that 0.5 part zinc phosphate, $Zn_3(PO_4)_2$ was used in place of zinc sulphate. Glass fibers coated with the combined sizing and coating exhibited excellent adhesion properties and likewise, elastomeric materials reinforced with the treated glass fiber materials had excellent tensile strengths.

EXAMPLE IV

Combined Sizing and Coating Composition

A combined sizing and coating composition having the following formula was prepared:

| | |
|---|---|
| GenTac synthetic rubber latex (15:70:15) styrene-butadiene-vinyl pyridine | 200 parts |
| Water | 225 parts |
| Furfuryl alcohol | 25 parts |
| Zinc sulphate | 1 part |
| Ammonia | 25 parts |
| Gamma-aminopropyltriethoxysilane | 1 part |

EXAMPLE V

Coating Composition

A coating composition was prepared having the following formula:

| | |
|---|---|
| GenTac synthetic rubber latex (15:70:15) styrene-butadiene-vinyl pyridine | 200 parts |
| Furfuryl alcohol | 25 parts |
| Zinc sulphate | 1 part |
| Ammonia | 25 parts |
| Water | 250 parts |

Glass fiber materials previously sized with an aqueous composition containing the coupling agent gamma-aminopropyltriethoxysilane were coated with the foregoing coating composition and a weight gain of about 15 – 20% by weight was realized based on the weight of the dry glass and the coated fibers exhibited excellent adhesion to elastomeric materials and in addition, elastomeric materials reinforced with such coated glass fibers have excellent tensile strengths.

EXAMPLE VI

Combined Sizing and Coating Composition

A combined sizing and coating composition was prepared in the manner of Example I with the exception that one part of ureido-propyltriethoxysilane coupling agent was used in place of the gamma-aminopropyltriethoxysilane.

EXAMPLE VII

Combined Sizing and Coating Composition

A combined sizing and composition having the following formula was prepared:

| | |
|---|---|
| Acrylonitrile latex | 100 parts |
| GenTac synthetic rubber latex (15:70:15) styrene-butadiene-vinyl pyridine | 120 parts |
| Furfuryl alcohol | 15 parts |
| Ammonia | 15 parts |
| Zinc sulphate | 1 part |
| Gamma-aminopropyltriethoxysilane | 1 part |
| Water | 240 parts |

Glass fiber materials coated according to the method described with the foregoing composition exhibited excellent adhesion to elastomeric materials and in addition, elastomeric materials reinforced with such treated fibers showed excellent tensile strengths.

Examples VIII – XI illustrate other formulations of a combined sizing and coating composition in accordance with the invention and Example XII is a combined sizing and coating composition that was used as a control and did not include the zinc sulphate.

EXAMPLE VIII

| | |
|---|---|
| Water | 920 parts |
| Ammonium hydroxide | 260 parts |
| Zinc sulphate | 8 parts |
| GenTac latex (15:70:15) styrene-butadiene-vinyl pyridine | 2,600 parts |
| Gamma-aminopropyltriethoxysilane | 12 parts |

EXAMPLE IX

| | |
|---|---|
| Water | 10,000 parts |
| Ammonium hydroxide | 400 parts |
| Zinc sulphate | 16 parts |
| Nadex 330 starch | 100 parts |
| Emerylub 1200-36-fatty acid (Lubricant) | 50 parts |
| Gamma-aminopropyltriethoxysilane | 35 parts |
| Nopco NXZ anti-foam agent | 1 part |
| GenTac latex (15:70:15) styrene-butadiene-vinyl pyridine | 7,000 parts |
| Furfuryl alcohol | 500 parts |

EXAMPLE X

| | |
|---|---|
| Water | 4,000 parts |
| Potassium hydroxide | 4 parts |
| Resorcinol | 360 parts |
| Formaldehyde - 37% solids | 500 parts |
| GenTac latex (15:70:15) styrene-butadiene-vinyl pyridine | 8,800 parts |
| Ammonium hydroxide | 350 parts |
| Water | 2,500 parts |
| Ammonium hydroxide | 120 parts |
| Zinc sulphate | 8 parts |

-continued

| | |
|---|---|
| Furfuryl alcohol | 200 parts |
| Casein | .5 part |
| Gamma-aminopropyltriethoxysilane | 30 parts |

EXAMPLE XI

| | |
|---|---|
| Water | 4,000 parts |
| Ammonia | 2,000 parts |
| Zinc sulphate | 8 parts |
| Polyvinyl alcohol | 40 parts |
| Furfuryl alcohol | 400 parts |
| Nopco 1186A Octylsuccinate wetting agent | 1 part |
| Tetronic 704 Surfactant | 500 parts |
| Gamma-aminopropyltriethoxysilane | 30 parts |
| GenTac latex (15:70:15) styrene-butadiene-vinyl pyridine | 2,800 parts |
| Nopco NXZ anti-foaming agent | .5 part |

EXAMPLE XII

Control

| | |
|---|---|
| Water | 3,950 parts |
| Resorcinol | 180 parts |
| Sodium hydroxide | 2.5 parts |
| Formaldehyde (37% solids) | 266 parts |
| GenTac latex (15:70:15) styrene-butadiene-vinylpyridine | 4,000 parts |
| Ammonium hydroxide | 190 parts |
| Gamma-aminopropyltriethoxysilane | 35 parts |

The following table clearly illustrates that the combined sizing and coating compositions of Example VII through XI inclusive containing $ZnSO_4$ have equal and/or superior tensile or adhesion properties when compared with a control combined sizing and coating composition without the $ZnSO_4$. The strands which were coated contained 1000 filaments per strand.

Tensile strength of glass fiber cord is determined by use of an Instron test device. A cord to be stated is mounted on the clamps or jaws of an Instron test device so that the gage length or distance between the points of tangency of the cord and the clamping blocks is ten inches. The Instron device is operated at two inches/minute crosshead speed until the specimen cord breaks. The load and elongation at cord failure are recorded for a sample of $n$ cords, with $n$ usually equal to 10. The percent elongation of each cord is determined as: % elongation=inches elongated/$10 \times 100$. Percent elongation is determined for each cord at 20 and 50 percent of the load at cord failure. Breaks within ¼ inch of the clamps are considered "jaw-breaks" due to damage in clamping and the results discarded. Average breaking strength and elongation are determined for ($n$ — "jaw-breaks") samples.

Tensile strength of rubber coated glass fiber cord embedded in rubber is determined using samples prepared each with three parallel cords embedded between two 50–55 mil thick layers of common rubber stock (as Firestone No. 8634). Samles are prepared by placing the fibers between rubber sheets, placing them in a preheated press at about 300°F, pressing at about 7.1 tons for about 25 minutes cure time, quick chilling and cutting off trim.

As Instron test device is used as for cord tensile strength determinations. A gage length of 7 to 7½ inches is used and a crosshead speed of two inches per minute is established until the test specimen ruptures.

Strength or load at rupture is determined but normally elongation is not. Again a number of specimens are tested and the results averaged.

Strip adhesion for rubber coated glass fiber cord is determined by the following method. Three sheets of 50–55 mil rubber stock approximately 8¼ × 11 inches are placed in a mold. A 2½" wide strip of Holland cloth is placed at each end of the rubber slab over the top rubber sheet. Glass fiber cord to be tested is placed over the rubber and additional strips of Holland cloth are placed over the cord at each end. Three similar rubber sheets are placed over the cord and the entire combination is pressed in the mold at about 100 pounds per square inch for about 25 minutes at about 300°F to cure the rubber. The rubber-cord laminate is removed from the mold and allowed to slowly (overnight) cool to room temperature.

The Holland cloth is removed separating the ends of the laminate test specimen. After setting an Instron test device for a gage length of ½" to ¾ inch and calibrating the unit for a crosshead speed of 2 inches per minute, the bottom layer of rubber and the cord are placed in the top jaw and the top layer of rubber in the bottom jaw of the test device. The Instron test device is operated until a separation of two inches is obtained and the loading noted. The top layer of rubber is then inserted in the top jaw and the cord in the bottom jaw with a gage length of ½" to ¾ inch. The Instron device is again operated until a separation of 2 inches is obtained and the loading noted. The test is repeated for the opposite end of the specimen and for additional specimens included in the sample. The results of the tests are averaged for the adhesion of the cord to rubber.

Typical commercial rubber compounds containing principally styrene butadiene rubber and selected to have the following properties are used to test glass fiber properties: Optimum cure at 300°F, about 30 minutes; 300 percent modulus, about 1900 pounds/square inch; tensile strength about 2900 pounds/square inch; elongation at failure, about 430 percent; hardness, about 64; and specific gravity about 1.13.

"elastomeric" or "rubber" or "rubber-like material" is intended therefore to include natural and synthetic rubber in the uncured or unvulcanized state and in the cured or vulcanized state.

EXAMPLE XIII

A 3 gallon batch of elastomeric dip was prepared using the ingredients in the amounts shown in Table II.

TABLE II

| | Parts by Wt. |
|---|---|
| Water | 1,995 |
| Potassium hydroxide | 4 |
| R-2170 (Resorcinol-formaldehyde novolak resin) | 555 |
| Ammonium hydroxide | 300 |
| GenTac latex (15:70:15)styrene-butadiene-vinylpyridine | 7,250 |
| Formaldehyde (37% solids) | 200 |
| Gamma-aminopropyltriethoxysilane | 68 |
| Water | 1,000 |
| Ammonium hydroxide | 68 |

To a dip of the above composition zinc sulphate and zinc oxide were added to compare the runnability of dip prepared using each of these additives when it was applied to fiber glass strand. In addition, strip adhesion tests were conducted on rubber test specimens using glass fibers coated with the dip of Table II with zinc oxide and zinc sulphate being added to the dip using the procedure hereinabove described. The specimens were baked at 250°F for 30 minutes immediately prior to testing. The results of these tests are shown in Tables III and IV.

TABLE III

| Run | ZnO Parts by Wt. Basis 100 Parts of Latex | Adhesion Lb. Pull | Runnability (Visual) |
|---|---|---|---|
| 1 | 0.5 | 29.5 | good–fair |
| 2 | 0.25 | 39 | good–fair |
| 3 | 0.25 | 25 | fair |

TABLE I

| Example | Running Speed fpm | Fiber Diameter | Temp. of 12 Ft. Elect. Oven, °F | Direct Coat Dip Pick-Up Wt. % bare glass | Resorcinol Formaldehyde Latex-Overcoat Wt. % bare glass | Tensile, Lb. Pull In Air | Tensile, Lb. Pull In Rubber | Strip Adhesion Lb. Pull Room Temp. |
|---|---|---|---|---|---|---|---|---|
| XII Control | 1200 | G | 1000 | 9 | 12 | 41 | 70 | 55 |
| XII Control | 1200 | G | 1000 | 9 | — | 34 | 66 | 47 |
| VIII | 700 | K | 950 | 6.5 | 9 | 49 | — | 79 |
| IX | 1200 | G | 1000 | 8 | — | 37 | 79 | 33 |
| X | 1200 | G | 1100 | 15 | — | — | 67 | 58 |
| XI | 1200 | G | 1000 | 7.5 | 10.6 | 52 | 80 | 74 |
| XI | 1200 | G | 1000 | 9 | 15 | — | 71 | — |

As illustrated in Table I, the coated strands have a satisfactory adhesion and tensile strength in glass fiber reinforced elastomeric products. Cord or fabric prepared from the coated strands was readily impregnated by additional rubber adhesive and improved properties were obtained. The elastomeric materials to which the coated strands can be added as a reinforcement include natural rubbers or rubbers formed synthetically of butadiene, chloroprene, isoprene and the like or copolymers of butadiene, chloroprene, isoprene with other materials well known in the manufacture of synthetic rubbers and especially the vulcanizable and curable modifications of the above. The term "elastomer" or

| 4 | 0.25 | 26 | fair |

TABLE IV

| Run | ZnSO$_4$ | Adhesion Lb. Pull | Runnability |
|---|---|---|---|
| 1 | 0.75 | 34 | good |
| 2 | 0.75 | 34 | good |
| 3 | 0.5 | 27 | good |
| 4 | 0.75 | 40 | good |
| 5 | 0.75 | 33 | good |

The invention has been described with respect to details of the preferred coating and combined sizing and coating composition and the best mode of operation contemplated by the inventor. Other formulations of the coating composition and a combined sizing and coating composition are contemplated which should be obvious in light of the previous description. It is to be understood that the invention is, therefore, not necessarily limited to the precise formulations and method described herein.

I claim:

1. In a glass fiber coating composition useful in preparing glass fibers for reinforcing elastomers comprising an aqueous dispersion of an elastomeric latex selected from the group consisting of natural and synthetic rubber latices and a rubber adhesive, the improvement comprising, as said adhesive, a zinc salt in an amount from 0.01 to 5 percent by weight based on the total weight of the coating composition, said zinc salt being capable of being complexed with ammonia and having a solubility constant of not less than $1 \times 10^{-3}$; and having present in the dispersion sufficient ammonia for complexing the zinc salt present.

2. The composition of claim 1 wherein said dispersion also contains a resorcinol-formaldehyde resin.

3. The composition of claim 1 wherein said zinc salt is selected from the group consisting of zinc sulphate, zinc phosphate, zinc nitrate and zinc chloride.

4. The composition of claim 4 wherein said amino-functional silane coupling agent is gamma-aminopropyltriethoxysilane.

5. The composition of claim 4 wherein said elastomeric latex is a styrene-butadiene-vinylpyridine terpolymer.

6. In a coating composition for coating glass fibers, said glass fibers useful in reinforcing elastomeric materials, comprising an aqueous dispersion containing an elastomeric latex selected from the group consisting of natural and synthetic rubber latices and a rubber adhesive having furfuryl alcohol therein, the improvement comprising, as said adhesive, in an amount of 0.01 to 5 percent by weight based on the total weight of the coating composition, said zinc salt being capable of being complexed with ammonia and having a solubility constant of not less than $1 \times 10^{-3}$; and having present in the dispersion sufficient ammonia for complexing the zinc salt present.

7. In a coating composition for coating glass fibers comprising an aqueous dispersion containing an elastomeric latex selected from the group consisting of natural and synthetic rubber latices, a silane coupling agent selected from the group consisting of amino, amido, epoxy, chloropropyl and ureido-functional silanes and a rubber adhesive containing furfuryl alcohol, the improvement comprising, as the rubber adhesive, a zinc salt in an amount of 0.01 to 5 percent by weight based on the total weight of the coating composition, said zinc salt being capable of being complexed with ammonia and having a solubility constant of not less than $1 \times 10^{-3}$; and having present in the dispersion sufficient ammonia to complex the zinc salt present.

8. In a glass fiber composition suitable for use in reinforcing elastomeric materials comprising glass fibers having a coating thereon comprising a natural or synthetic rubber the improvement comprising said coating containing a zinc salt, said salt being present in an amount of 0.014 to 20 percent by weight based on the weight of the coating and having a solubility constant of not less than $1 \times 10^{-3}$.

9. The composition of claim 8 wherein the glass fiber composition is present in a strand containing a plurality of said coated glass fibers.

10. In a glass fiber composition suitable for use in reinforcing elastomeric materials, comprising: glass fibers having a coating thereon comprising a natural or synthetic rubber and a silane coupling agent, the improvement comprising said composition containing a zinc salt, said zinc salt being present in an amount of 0.01 to 5 percent by weight of the coating and having a solubility constant of not less than $1 \times 10^{-3}$.

11. The composition of claim 10 wherein the glass fiber composition is present in a strand containing a plurality of said coated glass fibers.

12. In a coating composition for coating glass fibers comprising an aqueous dispersion containing an elastomeric latex selected from the group consisting of natural and synthetic rubber latices, a silane coupling agent selected from the group consisting of amino, amido, epoxy, chloropropyl, and ureido-functional silanes and a rubber adhesive, the improvement comprising, as said adhesive, a zinc salt in an amount of 0.01 to 5 percent by weight based on the total weight of the coating composition, and being capable of being complexed with ammonia, said zinc salt having a solubility constant of not less than $1 \times 10^{-3}$; and having present in the dispersion sufficient ammonia for complexing the zinc salt present.

* * * * *

UNITED STATES PATENT OFFICE
CERTIFICATE OF CORRECTION

PATENT NO. : 3,940,357
DATED : February 24, 1976
INVENTOR(S) : Dennis M. Fahey

It is certified that error appears in the above–identified patent and that said Letters Patent are hereby corrected as shown below:

Column 13, line 29, "4" should be --12--.

Column 13, line 32, "4" should be --12--.

Column 14, line 45, "and" should be --said zinc salt--.

Column 14, line 46, "said zinc salt" should be --and--.

Signed and Sealed this fifteenth Day of June 1976

[SEAL]

Attest:

RUTH C. MASON
Attesting Officer

C. MARSHALL DANN
Commissioner of Patents and Trademarks